United States Patent
Burnworth et al.

(10) Patent No.: US 7,281,673 B2
(45) Date of Patent: Oct. 16, 2007

(54) MULTI-PATTERN SPRAY NOZZLE ASSEMBLY WITH MOVABLE WATER CONDUIT

(75) Inventors: Douglas Burnworth, Confluence, PA (US); Douglas Shaulis, Somerset, PA (US); Timothy DeVore, Rockwood, PA (US); Thomas C. Oyler, Louisville, KY (US)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 10/901,579

(22) Filed: Jul. 29, 2004

(65) Prior Publication Data

US 2006/0022071 A1     Feb. 2, 2006

(51) Int. Cl.
    A62C 31/02   (2006.01)
    B05B 1/32    (2006.01)
(52) U.S. Cl. .............. 239/394; 239/392; 239/538; 239/539; 239/525
(58) Field of Classification Search .............. 239/548, 239/550, 551, 538, 539, 540, 541, 394, 537, 239/350, 536, 390; 222/380
See application file for complete search history.

(56) References Cited

U.S. PATENT DOCUMENTS

| | | | |
|---|---|---|---|
| 2,132,333 A * | 10/1938 | Wendell et al. | 239/394 |
| 2,388,093 A | 10/1945 | Smith | |
| 3,516,611 A | 6/1970 | Piggott | |
| 3,640,310 A | 2/1972 | Erlich | |
| 4,187,986 A | 2/1980 | Petrovic | |
| 4,398,669 A | 8/1983 | Fienhold | |
| 4,518,122 A * | 5/1985 | Ballu | 239/530 |
| 4,613,077 A | 9/1986 | Aronson | |
| 4,629,125 A | 12/1986 | Liu | |
| 4,909,443 A | 3/1990 | Takagi | |
| 4,976,467 A * | 12/1990 | Paige | 239/381 |
| 5,046,218 A | 9/1991 | Cerri | |
| 5,111,993 A | 5/1992 | Baker | |
| 5,303,868 A | 4/1994 | Kroll | |
| 5,501,400 A * | 3/1996 | Kuo | 239/394 |
| 5,566,886 A | 10/1996 | Wang | |
| 5,645,222 A * | 7/1997 | Chih | 239/394 |
| 6,435,427 B1 | 8/2002 | Conroy | |
| 6,460,782 B1* | 10/2002 | Wang | 239/390 |
| 6,866,208 B2* | 3/2005 | Kao | 239/526 |

* cited by examiner

*Primary Examiner*—Kevin Shaver
*Assistant Examiner*—James S. Hogan
(74) *Attorney, Agent, or Firm*—Maginot, Moore & Beck (57) ABSTRACT

A multi-pattern spray nozzle assembly includes a movable internal water conduit that may be in the form of a rotary member. The movable water conduit is movable between a plurality of spray stations on a spray head, each spray station capable of generating a different spray pattern. The movable water conduit may be manipulated by a knob located at the rear portion of the multi-pattern spray nozzle assembly.

15 Claims, 6 Drawing Sheets

MULTI-PATTERN SPRAY NOZZLE ASSEMBLY WITH MOVABLE WATER CONDUIT

FIELD OF THE INVENTION

The present invention relates to water spraying nozzles, and in particular, to a multi-pattern nozzle.

BACKGROUND OF THE INVENTION

Water spray nozzles capable of providing multiple spray patterns are well known. Such nozzles are useful, for example, as nozzles that may be attached to a garden hose. By selecting one of a plurality of spray patterns, the nozzle may be used to create a jet of water that may be projected to spray water a long distance, a mist spray, a gentle soaking spray, and/or other spray patterns. Such nozzles are thus useful in replacing a number of individual nozzles that generate only a single pattern.

Generally, multiple pattern spray nozzle assemblies include a rotary spray head with a number of different outlets. By aligning the different outlets with an internal water conduit, water is directed to the different outlets to obtain the different patterns of spray. Such nozzle assemblies suffer from various shortcomings. For example, the rotary spray head is generally at the front end of the nozzle assembly, where water exits the nozzle assembly. Accordingly, to change the spray pattern, the water supply to the spray head must be halted or else the user is doused with the water exiting the nozzle assembly since a user's hand must typically be advanced in front of the spray path of the nozzle assembly in order to perform such function. However, even when the water supply is halted, typically by releasing a spray trigger, some water remains on the spray head. Thus, a user's hand and/or glove become wet. Furthermore, the spray trigger may be accidentally activated as the user holds the nozzle assembly and attempts to rotate the spray head, dousing the user.

Another shortcoming is that the spray head area of the nozzle assembly frequently comes in contact with dirt and/or other debris as the nozzle assembly is placed on the ground. Because of the water that generally remains on the spray head even when the water supply to the spray head is halted, the debris becomes caked onto to the spray head. Subsequent rotation of the spray head moves the debris into the junction where the spray head joins the body of the nozzle assembly. Eventually, the presence of debris may cause binding of the rotary spray head and/or misalignment between the internal water conduit, causing difficulty in rotation and/or leakage.

What is needed is a multi-pattern spray nozzle that does not require a user to rotate a spray head located at the forward portion of a nozzle assembly by grasping the spray head itself or some other device at the front portion of the nozzle assembly. It would be beneficial if the multi-pattern spray nozzle were capable of providing multiple patterns of spray without the use of a rotating joint at the front of the nozzle assembly that is subjected to debris.

SUMMARY OF THE INVENTION

A multi-pattern spray nozzle in accordance with the present invention overcomes limitations previously encountered with garden hose multi-pattern spray hoses. The multi-pattern spray nozzle of the present invention includes an internal water conduit that is movable between a plurality of positions. In a first position, water exits the nozzle assembly in a first spray pattern. In a second position, water exits the nozzle assembly in a second spray pattern, the second spray pattern different from the first spray pattern.

In one embodiment, a multi-pattern spray nozzle in accordance with the present invention includes a housing, a spray head and an internal rotary member. The spray head includes a plurality of spray stations, each spray station operable to generate a different spray pattern when water is directed to the spray station. Manipulation of the rotary member aligns an internal water conduit with one of a plurality of spray pattern orifices such that water exiting the multi-pattern spray nozzle forms a first spray pattern. Continued manipulation of the rotary member causes the internal water conduit to be aligned with a second of the plurality of spray pattern orifices such that water exiting the multi-pattern spray nozzle forms a second spray pattern.

Advantageously, the movable internal water conduit may be a tube that is moved by a device that is not located in the forward portion of the nozzle assembly. In one embodiment, the device is in the form of a knob located at the rear portion of the multi-pattern spray nozzle assembly. In another embodiment, the device is in the form of a rod extending from the rotary member out of the housing of the spray nozzle assembly.

It is an object of the present invention to provide a multi-pattern spray nozzle assembly that allows for selection of a spray pattern by manipulation of a device that is not located at the forward portion of the spray nozzle assembly.

It is also an object of the present invention to provide a multi-pattern spray nozzle assembly that uses internal movement to obtain the multiple patterns of spray.

It is a further object of the invention to provide a multi-pattern spray nozzle assembly wherein the spray pattern is selected by a device located at the rear portion of the multi-pattern spray nozzle assembly.

These and other advantages and features of the present invention may be discerned from reviewing the accompanying drawings and the detailed description of the preferred embodiments of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION OF THE INVENTION

Figure 1:
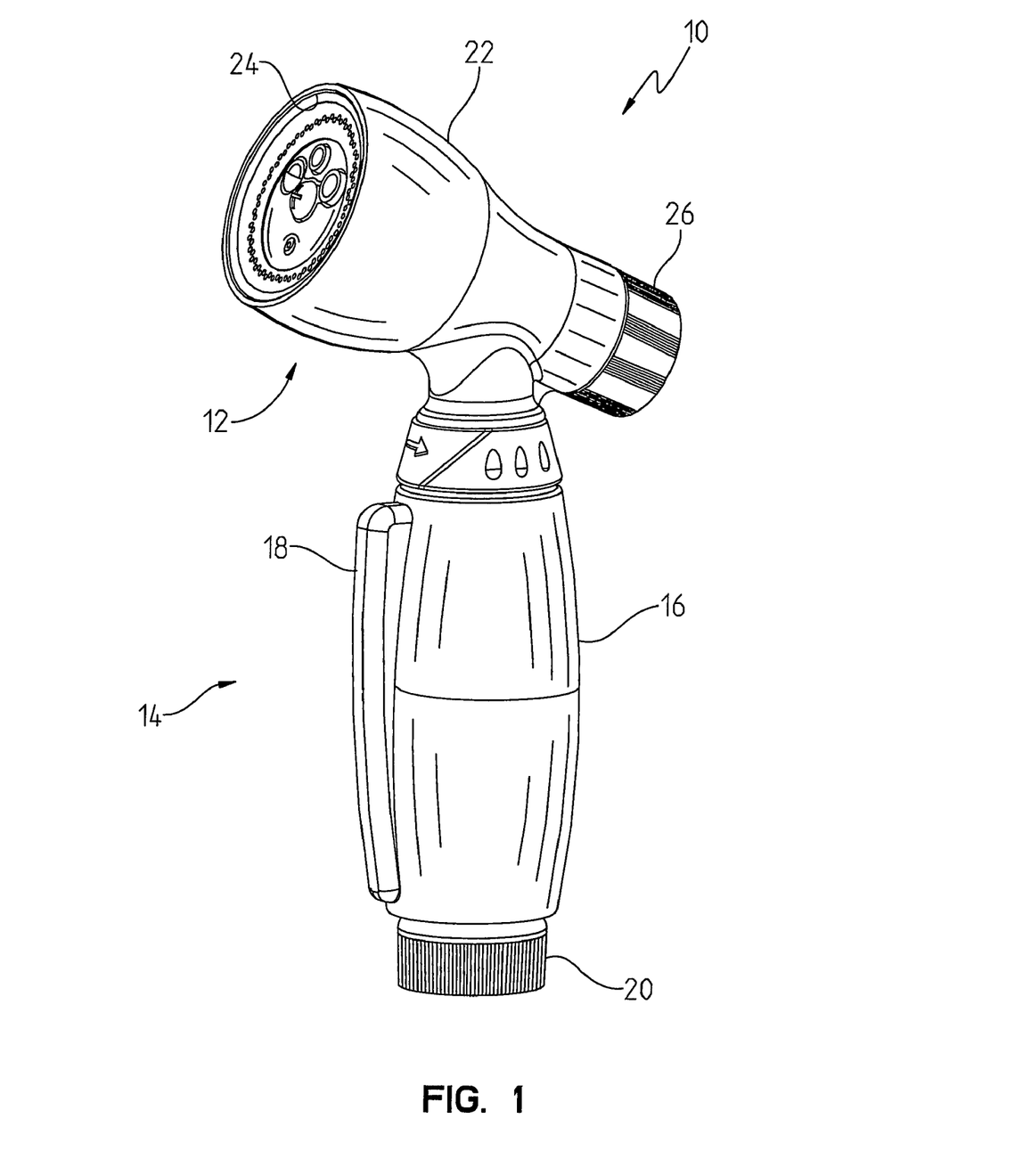
FIG. 1 shows a perspective view of a spray nozzle assembly incorporating features of the present invention.

FIG. 1 shows a spray nozzle assembly 10 which in this embodiment of the invention includes a spray control portion 12 and a handle portion 14. The handle portion 14 includes a handle housing 16, a trigger 18 and a handle portion water inlet 20. The spray control portion 12 includes spray control portion housing 22, spray head 24 and spray control knob 26.

Figure 2:
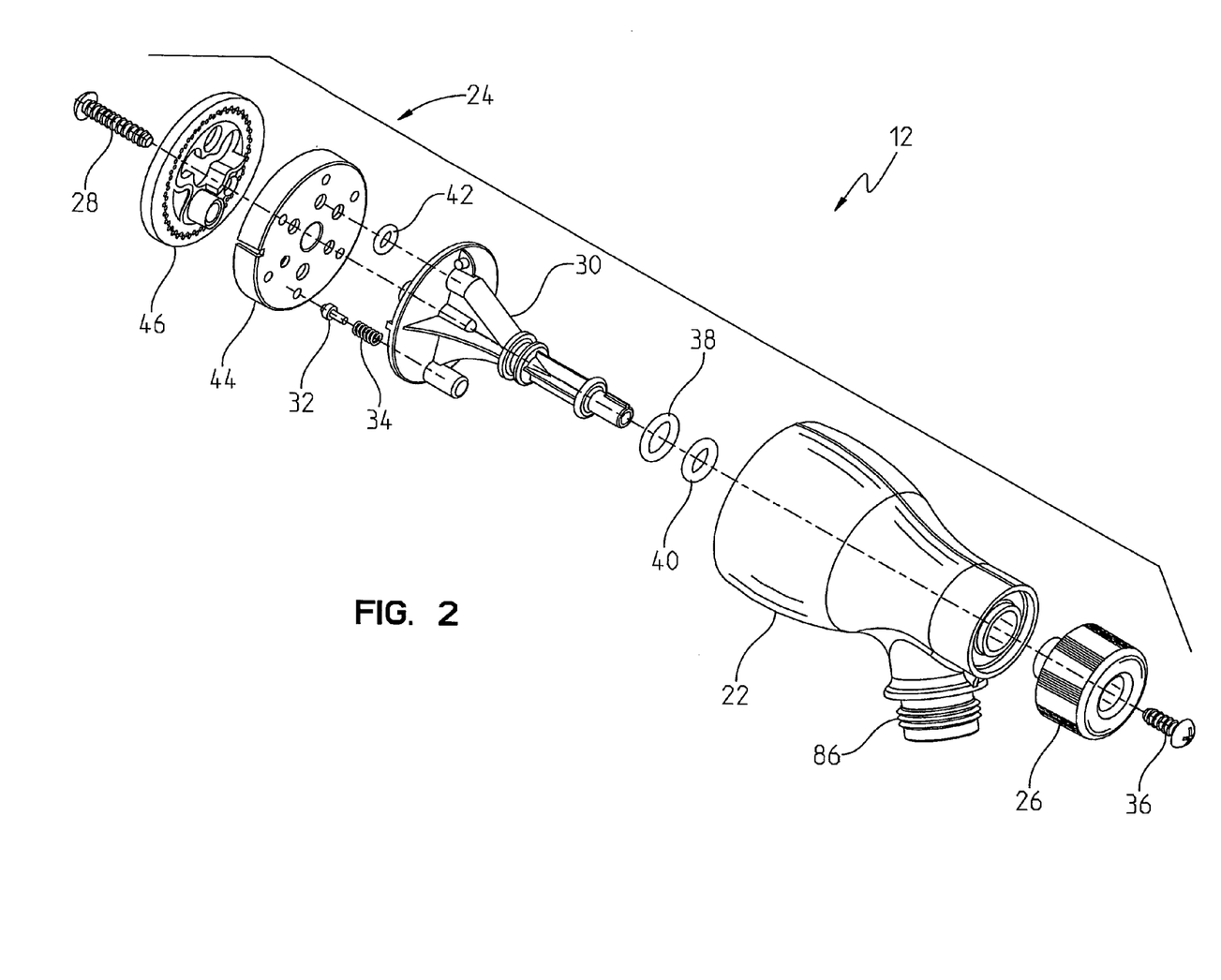
FIG. 2 shows an exploded perspective view of the components of the spray control of the spray nozzle assembly of FIG. 1.

Referring now to FIG. 2, the spray control portion 12 of the spray nozzle assembly 10 is shown in an exploded view. The spray control portion 12 further includes a forward portion screw 28, a rotary member 30, a detent pin 32, a detent spring 34 and a rear portion screw 36. The spray control portion 12 also includes two o-rings 38 and 40 and a seal 42. The o-rings 38 and 40 in this embodiment are made from an elastic material such as nitrile or ethylene propylene rubber material. The seal 42 is also made from an elastic material such as nitrile or ethylene propylene rubber material.

Figure 3:
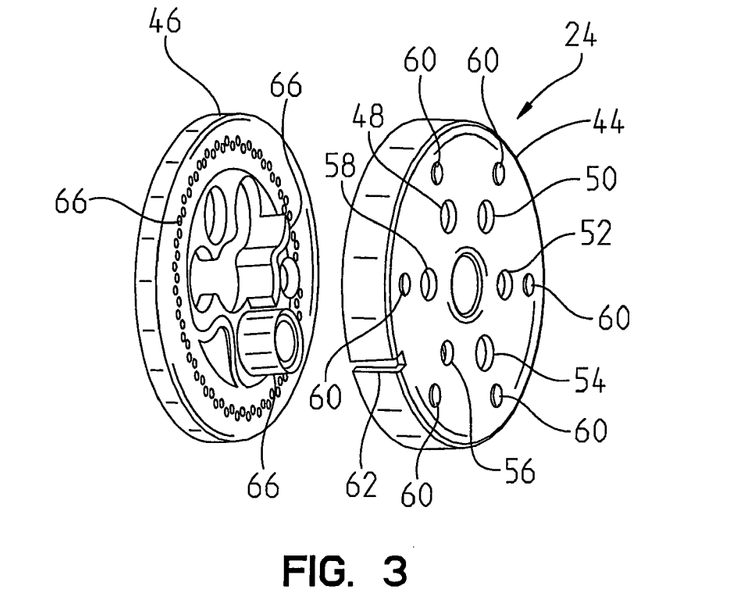
FIG. 3 shows an enlarged exploded perspective view of the spray head of the spray control of FIG. 2.

As shown more clearly in FIG. 3, the spray head 24 includes a spray head body 44 and a spray head cover 46. The spray head body 44 includes six spray station orifices 48, 50, 52, 54, 56 and 58. The rear side of spray head body 44 also includes six detent receptors 60, one detent receptor 60 associated with each of the six spray station orifices 48, 50, 52, 54, 56 and 58, as is discussed more fully below. One restraining notch 62 is located on the periphery of the spray head body 44. The six spray stations further include moldings within the spray head. The front side of the spray head body 44 is molded (see FIG. 7) to cooperate with the molding of the rear side of spray head cover 46 (see e.g. moldings 66) such that water that is directed through each of the six spray station orifices 48, 50, 52, 54, 56 and 58 is expelled from the spray nozzle assembly 10 in a different spray pattern as is known in the art. The spray head body 44 and spray head cover 46 are preferably made from a plastic material such as abs or polystyrene.

Figure 4:
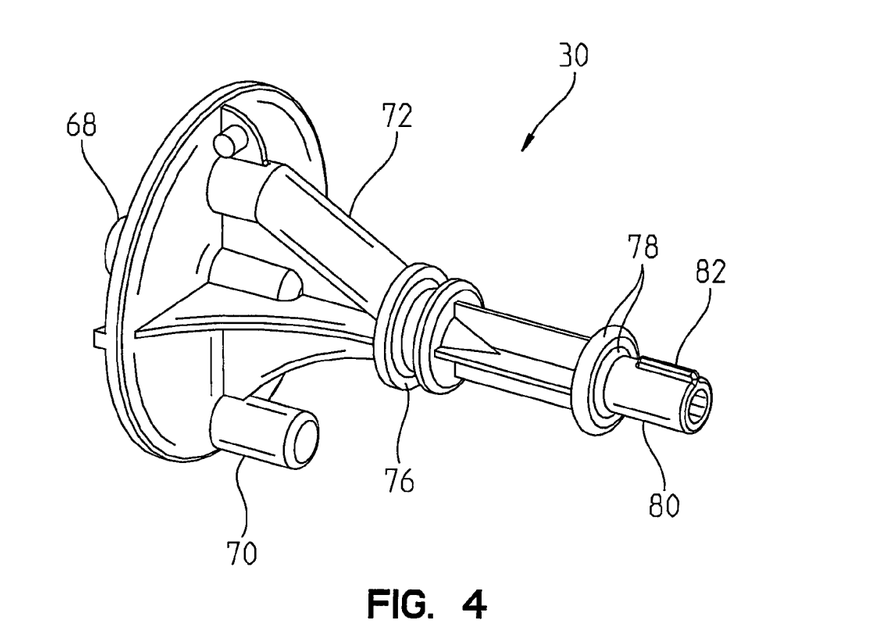
FIG. 4 shows an enlarged perspective view of the rotary member of the spray control of FIG. 2.
Figure 5:
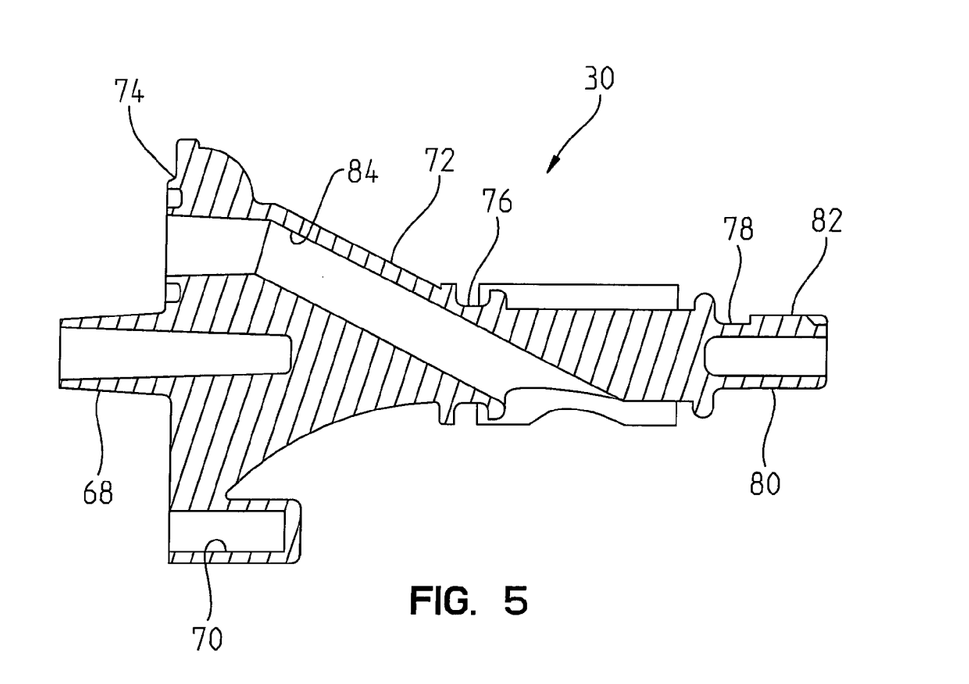
FIG. 5 shows a cross sectional view of the rotary member of FIG. 4.

Referring now to FIG. 4 and FIG. 5, the rotary member 30 includes forward portion screw boss 68, a detent pin well 70, a body 72, a seal well 74, two o-ring wells 76 and 78, and rear portion screw boss 80 which includes a ridge 82. The body 72 of the rotary member 30 defines a tube that includes an internal channel or conduit 84 that extends from the lower rear portion of the rotary member 30, as shown in FIGS. 4 and 5, to the forward portion of the rotary member 30. Rotary member 30 is made from a plastic material such as acetal.

Figure 6:
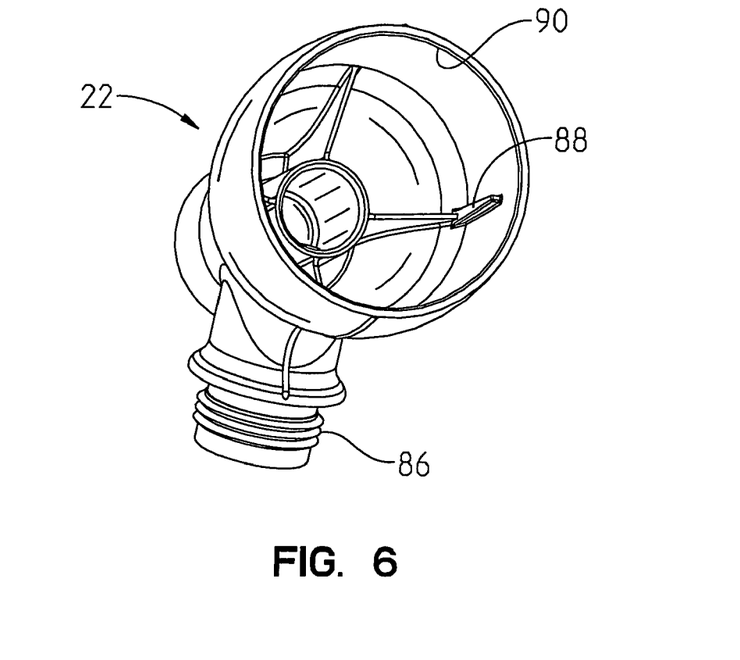
FIG. 6 shows an enlarged perspective view of the spray control portion housing of the spray control of FIG. 2.
Figure 7:
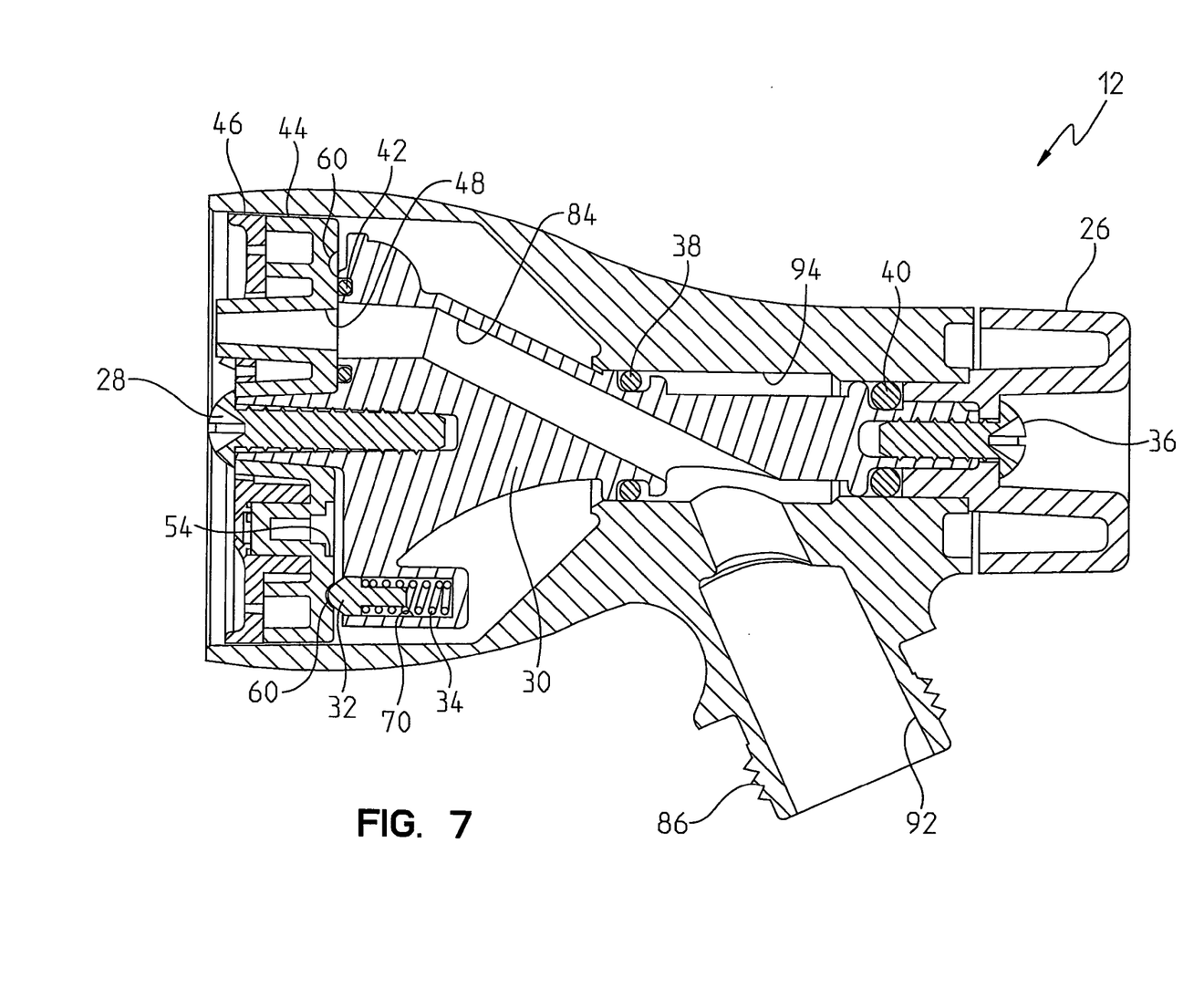
FIG. 7 shows an enlarged cross sectional view of the spray control of FIG. 2.

As shown in FIG. 6, the spray control portion housing 22 includes a threaded inlet 86 and a restraining member 88. Alternatively, instead of a threaded inlet, a snap-together coupler (not shown) which includes an internal snap ring (not shown) may be used to as a coupling mechanism at the portion of the device. The spray control portion housing 22 defines an inner chamber 90 and, as shown in FIG. 7, an internal channel 92 that provides fluid communication between the threaded inlet 86 and the inner chamber 90. The spray control portion housing 22 is made from a plastic material such as polypropylene abs or polystyrene, or alternatively zinc.

FIG. 7 shows a cross sectional view of the assembled spray control 12. When assembled, the o-rings 38 and 40 are inserted in the o-ring wells 76 and 78 respectively and rotary member 30 is located within the inner chamber 90 of the spray control portion housing 22. The o-rings 38 and 40 are in water tight engagement with the inner wall of the spray control portion housing 22, forming a chamber 94 that is in fluid communication with internal channel 92. The internal channel 84 of the rotary member 30 is also in fluid communication with the chamber 94.

The seal 42 is located within the seal well 74 and the detent pin 32 and the detent spring 34 are located within detent pin well 70. The spray head cover 46 is located in front of the rotary member 30, with the restraining member 88 of the spray control portion housing 22 located within the restraining notch 62 so as to prevent any rotation of the spray head cover 46. The spray head cover 46 is located adjacent to the spray head body 44. The front portion screw 28 is inserted through the spray head cover 46 and the spray head body 44 into the forward portion screw boss 68. The front portion screw 28 is tightened so as to force the detent pin 32 against the detent spring 34, with the detent spring 34 forced into compression. The spray head body 44 is also forced against the seal 42 which in turn is forced against the rotary member 30 within the seal well 74.

Accordingly, when the rotary member is positioned such that the detent pin 32 is aligned with one of the detent receptors 60, the detent spring 34 forces the detent pin 32 partially within the detent receptor 60 as shown in FIG. 7. When the detent pin 32 is aligned with one of the detent receptors 60, the seal 42 creates a water tight boundary about the spray station orifice 48, 50, 52, 54, 56 or 58 that is associated with the detent receptor 60. Thus, as shown in FIG. 7, the seal 42 has formed a watertight seal about spray station orifice 48.

In this embodiment, each of the detent receptors 60 is associated with a spray station orifice that is located 180° away from the detent receptor 60 around the periphery of the spray head body 44. The relative locations of the detent receptor and the associated spray station are a design choice. A salient characteristic of the positioning is that when the detent pin 32 engages the detent receptor 60, a spray station orifice is completely within the seal 42. This provides a user with a positive indication that the rotary member 30 is properly positioned with a selected spray station.

Another design consideration is locating the detent receptors such that they do not interfere with the water tight seal created by seal 42. This is shown in FIG. 7 as the receptor 60 associated with the spray station orifice 54 is above the seal 42. This location further avoids forcing the seal 42 over the detent receptor 60 as the rotary member 30 is rotated, thus reducing wear on the seal 42.

Continuing with the description of the assembled spray control 12, the spray control knob 26 is located on the rear portion of the rotary member 30 such that the ridge 82 is located within a ridge notch (not shown) on the spray control knob 26.

Operation of the rotational features of the embodiment of the invention shown in FIGS. 1-7 typically begins with the detent pin 32 fully aligned with a detent receptor and in full contact with the inner surface of the detent receptor 60. The internal channel 84 is similarly aligned with the spray station orifice associated with the detent receptor 60 which, for purposes of this example, is spray station orifice 48. The seal 42 provides a watertight seal between the internal channel 84 and the spray station orifice 48.

To obtain a spray pattern other than the spray pattern provided by the spray station orifice 48, a user rotates spray control knob 26. The spray control knob may be rotated in either direction in this embodiment. Accordingly, a user will typically rotate the spray control knob 26 in the direction that requires the least amount of rotation to obtain the desired spray pattern. For purposes of this example, the user desires to obtain the spray pattern provided by spray station orifice 58. Accordingly, the spray control knob 26 is rotated in a clock-wise direction.

The rotation of spray control knob 26 forces the spray control knob 26 against the ridge 82, torquing rotary member 30 in the clock-wise direction. The tortional force is passed through the rotary member 30 to the detent pin 32 which acts against the spray head body 44. The spray head body 44 is in a fixed position relative to the spray control portion housing 22 because the retraining member 88 of the housing 22 is positioned within the retraining notch 62. Accordingly, rotational motion is realized between the rotary member 30 and the spray head body 44. Thus, the detent pin 32 rides up the sides of the detent receptor 60, translating the tortional force into compressive force as detent spring 34 is compressed. Once detent spring 34 is compressed, detent pin is held against the rear surface of spray head body 44 by the force of compressed detent spring 34.

Continued twisting of the control knob 26 results in continued rotation of the rotary member 30 in the clock-wise direction. As the rotary member 39 rotates, the detent pin 32 slides across the rear surface of the spray head body 44 until the detent pin 32 begins to come into alignment with the next detent receptor 60. At this time, the compressed detent spring 34 forces the detent pin 32 at least partially within the detent receptor 60. The user may feel this as a momentary reduction in the force required to effect rotation, since a reduced frictional force is being generated. As the detent pin 32 is fully aligned with the detent receptor 60, the detent pin 32 may be heard or felt to move into full contact with the inner surface of the detent receptor 60.

When the detent pin 32 is fully aligned with the detent receptor 60, the internal channel 84 is fully aligned with the spray station orifice associated with the detent receptor 60, which in the present example is spray station orifice 58. Accordingly, the seal 42 provides a watertight seal about spray station orifice 58. The user may be made aware that the desired alignment has been achieved by the matching of an indicator on the control knob 26 with an indicator on the spray control portion housing 22 associated with the spray station orifice 58.

Water is supplied to the internal channel 84 of the rotary member 30 from the chamber 94. In the embodiment of FIG. 7, the chamber 94 completely surrounds the rotary member 30. Accordingly, water is supplied to the internal channel 84 regardless of the position of the rotary member 30 within the spray control portion housing 22. Those of skill in the art will appreciate, however, that a chamber need not completely surround the rotary member 30. By way of example, but not of limitation, a plurality of ports may be provided within the housing such that when the internal channel 84 is aligned with a spray station orifice, a port is aligned with the internal channel 84. Alternatively, a chamber may extend only partially around the rotary member 30.

Figure 8:
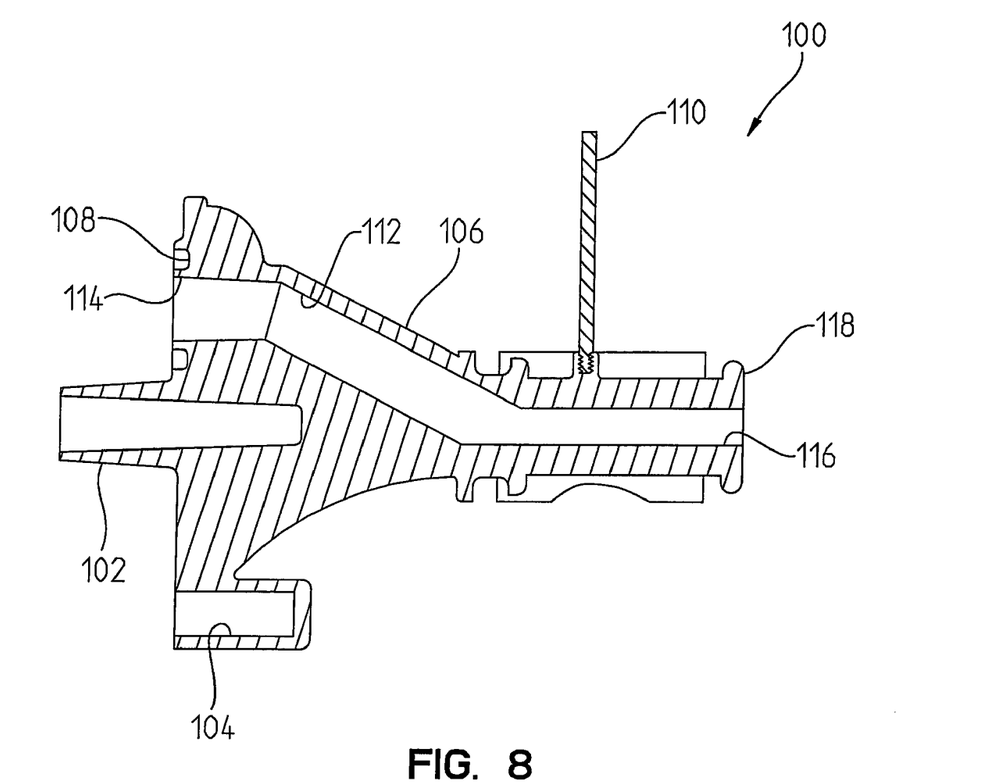
FIG. 8 shows a cross sectional view of an alternative embodiment of a rotary member incorporating features of the present invention.

In an alternative embodiment, water is provided to the rotary member at one end of the rotary member. Such an embodiment is shown in FIG. 8. The rotary member 100 includes forward portion screw boss 102, a detent pin well 104, a body 106, and a seal well 108. A manipulating device is provided in the form of spindle 110 which is threadedly engaged with the body 106. The body 106 defines conduit 112 which in this embodiment extends from the mouth 114 at the forward portion of the rotary member 100 to the mouth 116 at the rear portion 118 of the rotary member 100. Rear portion 118 is designed to be sealingly engaged with a water supply. If desired, the rear portion may be provided with an o-ring well.

The operation of rotary member 100 is similar to that of rotary member 30 described above with the exception that water enters the rotary member 100 at the rear portion of the rotary member 100 through mouth 116 and is directed to mouth 114. The mouth 114 is aligned with a spray station orifice (not shown) in a manner similar to that of rotary member 30. Rotation of rotary member 100 is effected by manipulation of spindle 110 which may extend through a slot in the housing of a spray nozzle assembly (not shown). Thus, as the spindle 110 is moved within the slot, the rotary member 100 rotates.

While the present invention has been illustrated by the description of exemplary processes and system components, and while the various processes and components have been described in considerable detail, applicants do not intend to restrict or in any way limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicants' general inventive concept.

We claim:

1. A multi-pattern spray nozzle assembly comprising:
   a housing;
   a spray head in fixed relationship with the housing and having a plurality of spray stations, each of the plurality of spray stations operable to generate a spray pattern different from the spray pattern generated by another of the plurality of spray stations;
   a water inlet located on the exterior portion of the housing and capable of receiving water from an external source; and
   a tube within the housing and having a first mouth in fluid communication with the water inlet and a second mouth movably alignable with each of the plurality of spray stations, such that when water is supplied to the multi-pattern spray nozzle assembly and the second mouth is aligned with a first of the plurality of spray stations, a first spray pattern is generated, and such that when water is supplied to the multi-pattern spray nozzle assembly and the second mouth is aligned with a second of the plurality of spray stations, a second spray pattern is generated.

2. The multi-pattern spray nozzle assembly of claim 1, further comprising:
   a manipulating device accessible from outside the housing and operably connected to the tube, such that when the manipulating device is moved, the tube moves.

3. The multi-pattern spray nozzle assembly of claim 2, wherein the manipulating device extends outside of the housing.

4. The multi-pattern spray nozzle assembly of claim 3, wherein the manipulating device comprises a knob located at the rear portion of the housing.

5. The multi-pattern spray nozzle assembly of claim 3, wherein:
   the housing comprises a front portion and a rear portion;
   the spray head is located at the front portion of the housing; and
   the manipulating device comprises a knob extending from the rear portion of the housing.

6. The multi-pattern spray nozzle of claim 2, wherein the manipulating device comprises a rod.

7. The multi-pattern spray nozzle assembly of claim 1, wherein
the housing further comprises a chamber in fluid communication with the water inlet; and
the first mouth of the tube is in fluid communication with the chamber.

8. The multi-pattern spray nozzle of claim 7, wherein the tube is rotatable within the housing.

9. The multi-pattern spray nozzle assembly of claim 8, wherein the tube is formed within a rotary member that extends through the chamber.

10. A multi-pattern spray nozzle assembly comprising:
a nozzle housing;
a rotary member located within the housing, the rotary member comprising,
a first and a second end portion,
an inlet located between the first and the second end portion,
an outlet located between the inlet and the second end portion, and
a conduit within the rotary member joining the inlet and the outlet;
a first sealing member operable to provide a water tight seal between the nozzle housing and the rotary member between the inlet of the rotary member and the first end portion of the rotary member;
a second sealing member operable to provide a water tight seal between the nozzle housing and the rotary member between the inlet of the rotary member and the second end portion of the rotary member;
a spray head having a plurality of spray stations, each of the plurality of spray stations operable to generate a different spray pattern from each of the other of the plurality of spray stations, and wherein the outlet of the rotary member is selectively sealable to each of the plurality of spray stations; and
a knob operably connected to the rotary member such that rotation of the knob causes rotation of the rotary member.

11. The multi-pattern spray nozzle assembly of claim 10, wherein the knob is located at the rear portion of the nozzle housing.

12. A multi-pattern spray nozzle assembly comprising:
a nozzle housing;
a rotary member located within the housing, the rotary member comprising,
a first and a second end portion,
an inlet located between the first and the second end portion,
an outlet located between the inlet and the second end portion, and
a conduit within the rotary member joining the inlet and the outlet;
a first sealing member operable to provide a water tight seal between the nozzle housing and the rotary member between the inlet of the rotary member and the first end portion of the rotary member;
a second sealing member operable to provide a water tight seal between the nozzle housing and the rotary member between the inlet of the rotary member and the second end portion of the rotary member;
a spray head having a plurality of spray stations, each of the plurality of spray stations operable to generate a different spray pattern from each of the other of the plurality of spray stations, and wherein the outlet of the rotary member is selectively sealable to each of the plurality of spray stations; and
a rod operably connected to the rotary member such that movement of the rod causes movement of the rotary member.

13. A nozzle assembly, comprising:
a housing having defined therein an upstream opening and a downstream opening, wherein fluid advancing through the nozzle assembly enters through said upstream opening and exits through said downstream opening;
a spray head having defined therein a plurality of spray orifices that are different in relation to each other;
a conduit rotatably mounted within said housing and having an inlet and an outlet, wherein (i) said inlet is in fluid communication with said upstream opening of said housing, and (ii) said outlet is in fluid communication with at least one of said plurality of spray orifices, said conduit defining a body having a first end and a second end, and said inlet interposed said first end and said second end;
a first seal positioned around said body; and
a second seal positioned around said body, said inlet interposed between said first seal and said second seal, said housing has an internal wall that defines an internal chamber, said first seal contacts said internal wall, and said second seal also contacts said internal wall.

14. A nozzle assembly, comprising:
a housing having defined therein an upstream opening and a downstream opening, wherein fluid advancing through the nozzle assembly enters through said upstream opening and exits through said downstream opening;
a spray head having defined therein a plurality of spray orifices that are different in relation to each other;
a conduit rotatably mounted within said housing and having an inlet and an outlet, wherein (i) said inlet is in fluid communication with said upstream opening of said housing, and (ii) said outlet is in fluid communication with at least one of said plurality of spray orifices; and
a user actuator coupled to said conduit, wherein movement of said user actuator causes movement of said conduit.

15. A nozzle assembly, comprising:
a housing having defined therein a fluid intake orifice;
a spray head in fixed relationship with the fluid intake orifice and having defined therein a plurality of spray orifices that are different in relation to each other;
a conduit positioned within said housing and having an inlet and an outlet, wherein (i) said inlet is in fluid communication with said fluid intake orifice of said housing, and (ii) said outlet is in fluid communication with at least one of said plurality of spray orifices; and
a user actuator coupled to said conduit, wherein movement of said user actuator causes movement of said conduit.

* * * * *